Jan. 2, 1968     L. A. WARNER     3,361,346
COMPUTING DEVICE
Filed April 18, 1967     2 Sheets-Sheet 1
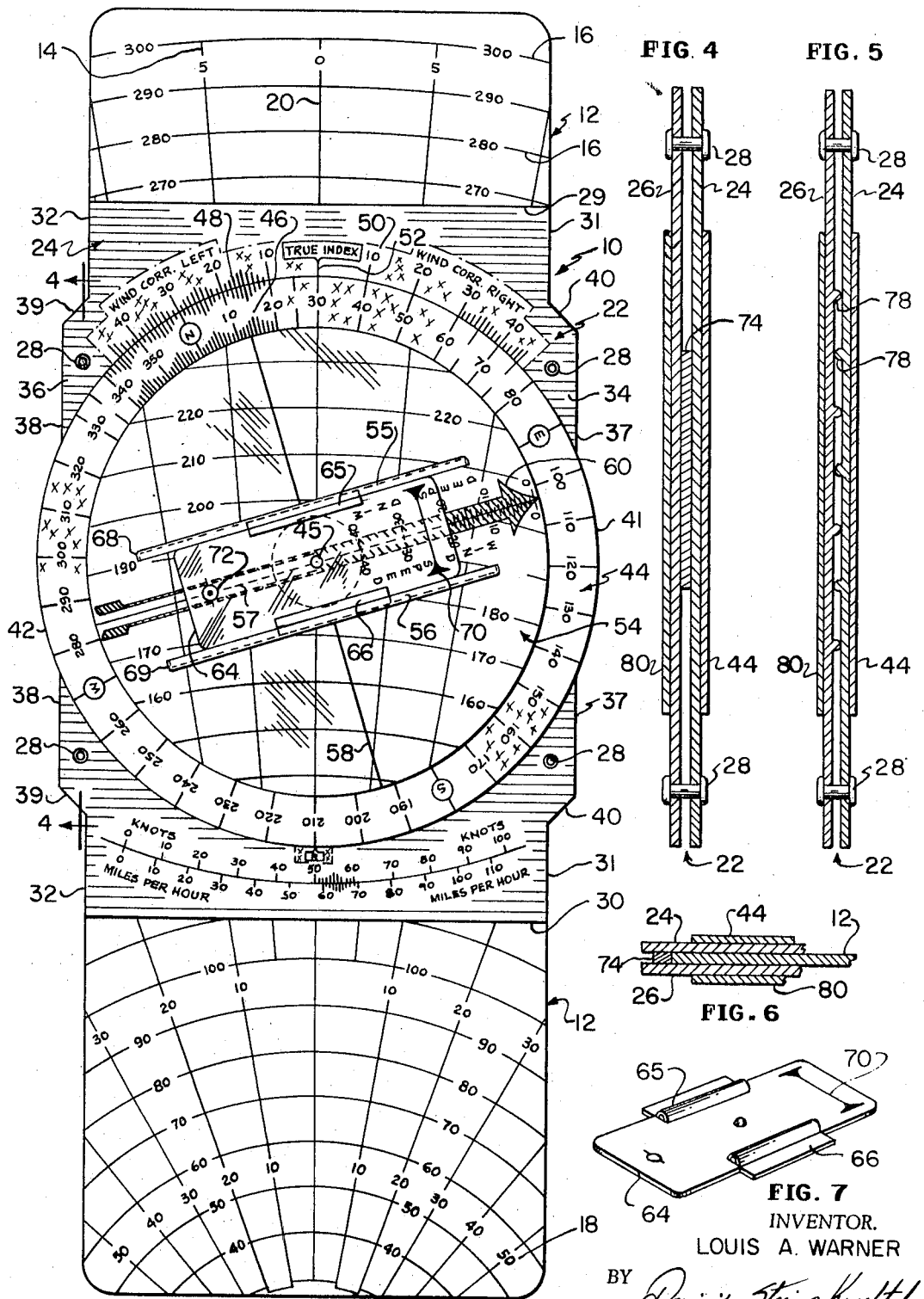
INVENTOR.
LOUIS A. WARNER
BY Dominik, Stein & Knechtel
ATTYS.

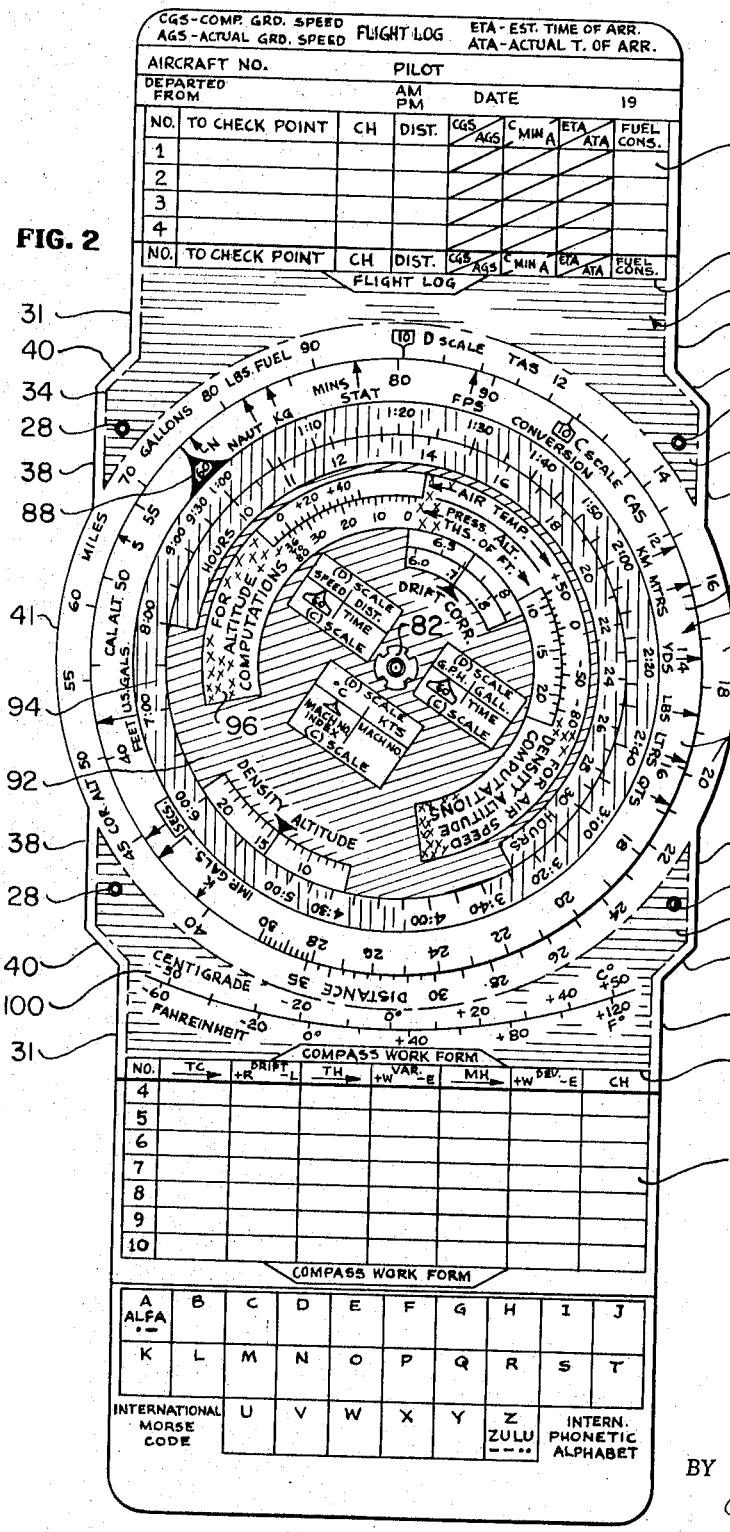

3,361,346
COMPUTING DEVICE
Louis A. Warner, 5223 N. Natoma,
Chicago, Ill. 60656
Filed Apr. 18, 1967, Ser. No. 631,691
9 Claims. (Cl. 235—61)

ABSTRACT OF THE DISCLOSURE

A navigational computing device including a computer body formed of a top member and a bottom member which are affixed together with fastener means and a slider member which is slidably received in the computer body. The fastener means perform the dual function of affixing the top and bottom members together and of aligning the slider member with the top member.

---

The present invention relates to a computing device and more particularly it relates to an improved computer for solving navigation problems.

In moderate speed aircraft aerial dead reckoning is the most common method of navigation used to direct an aircraft from one position to another. In aerial dead reckoning there are six basic variables that the navigator is continually concerned with, viz: true airspeed which is the relative speed of an aircraft through a body of air; true heading which is the direction in which the aircraft is pointed; wind speed; wind direction; ground speed which is the speed of the aircraft with relation to the ground; and true course which is the path the aircraft travels over the ground. The navigator of an aircraft has the job of pairing the six above noted quantities into appropriate vectors which are then added together to form the wind triangle which is the very heart of the dead reckoning method of aerial navigation.

The most frequently encountered problem in aerial dead reckoning is that in which the True Course, the wind direction and speed, and the aircraft's speed are known. By the graphic solution of the wind vector problem the pilot-navigator can determine what heading to fly to offset the effect of the wind drifting tendency, and what the ground speed will be. The solution of this problem is basic to all pre-flight planning, providing requisite information for the filing of flight plans and the calculation of fuel consumption requirements. In flight, the periodic revision of heading and ground speed information with changing wind conditions enables the pilot to reduce the amount of deviation from the desired course, and to correctly amend the estimates of arrival times over intermediate points or at the destination.

Another application of the graphic solution of the wind vector problem occurs when the true heading and true airspeed are known to the navigator from his instruments, i.e., the compass reading (corrected for deviation and variation) will indicate the true heading, and the airspeed indicator (corrected for altitude and temperature) will give the true airspeed. The wind direction and speed must be obtained from weather bulletins preceding and during flight since wind conditions are constantly varying. From the above given data, which as indicated must be corrected for ambient conditions, the navigator can then solve the wind triangle and get his ground speed and true course.

The ground speed combined with the time of flight will determine the distance flown, and the direction and distance values so determined can be utilized to plot a D.R. (dead reckoning) position on the chart.

In another application of wind vector solutions, where a fix is obtained either by radio or visual observation the True Course and Ground Speed can be obtained, and from instruments within the aircraft the True Heading and Air Speed can be determined. Thus, two sides of the wind triangle are known and the third side representing the actual wind direction and speed at flight level can be computed graphically.

There are many different types of computers known that are adaptable to the solution of the various problems indicated above. All computers are directed to serve the same fundamental purpose, i.e., rapid solution of dead reckoning mathematics with the minimum attention of the navigator to the solution of the various problems.

The mathematics involved in the solution of these navigational problems is not very difficult but it is endless. The navigator must constantly be aware of how far he has traveled, in what direction the aircraft is now flying, how fast he presently is traveling (with relation to the ground), how many minutes have elapsed since his last position check, what the wind conditions are and what effect they are having upon the course and speed of the aircraft, and many other aspects of navigation. As many as 150 separate computations may be required during one flight of about 4 hours duration in order to navigate the aircraft most effectively and accurately.

Most moderate speed aircraft flown today are in private or corporate service. A great many of these aircraft are flown by one person and it usually is the case that either that person is alone in the aircraft and of necessity must perform all navigational computations while flying the craft or he is the only person qualified to fly the aircraft, if more than one person is aboard, and similarly must solve navigational problems while flying the craft.

Thus, with only one qualified pilot-navigator within the aircraft, in most instances, it becomes rather important that the pilot be able to make all computations with one hand, leaving the other hand free to control and guide the aircraft. Most smaller aircraft are not equipped with automatic pilot controls to guide the plane along a predetermined course and therefore the pilot must pay strict attention to flight problems and conditions for the entire duration of the flight.

Since the pilot is required to divide his attention between piloting the aircraft and making his navigational computations it is important to assist the pilot in any manner possible in the design of a convenient computer.

An aircraft computing device, to be suitable for effective use in moderate speed aircraft must be designed such that computations may be performed with a minimum amount of effort and with reasonable simplicity. It, further, is of considerable advantage to combine into one instrument as many devices necessary to the solution of aerial navigation problems as is conveniently and reasonably feasible, without unduly complicating the device and without the sacrifice of simplicity of any of the separate computations to be performed on the computer.

In U.S. Patents 3,131,858 and 3,231,188 there are shown aerial navigational computers which meet each of these qualifications. The computer disclosed in U.S. Patent 3,131,858 has a cursor and a slide operable in conjunction with the cursor in a manner such that rapid, accurate solutions of basic aerial dead reckoning navigational problems can be provided. The computer disclosed in U.S. Patent 3,231,188 is of the same type, however, it has an improved cursor and slider assembly so that in addition to providing each of the many advantages of the computer of the first-mentioned patent it provides a cursor and slider assembly which is more easily operated and is less susceptible to damage or breakage.

While each of the computers disclosed in the above-mentioned patents is ideally suited to solving problems of the described type and has exceptional durability, one disadvantage they both suffer is the relatively high cost of manufacture. In view of this, both must retail for a corresponding relatively high cost. A large portion of the cost of manufacture is attributable to the hand-labor involved in assembling and aligning them which, in turn, results from the particular structure and manner in which they are designed. Accordingly, it would be extremely advantageous, cost-wise, to have a computer with the same features and advantages as each of the computers disclosed in these patents, but which could be assembled and aligned with a minimum amount of hand-labor and in a minimum amount of time.

The navigational computer of the present invention is of this design and, in addition to being substantially easier to assemble and align, it has numerous other features which make it more desirable from the standpoint of operability, utility, legibility and readability. These features, as well as others, are described below.

Accordingly, it is an object of the present invention to provide an improved navigation computer which may be easily operated to correlate the variables necessary to the solution of navigational problems to permit navigation of an aircraft by dead reckoning.

It is a further object of the present invention to provide an improved navigation computer that is simply and inexpensively manufactured, durable in construction and easy to operate.

An additional object of the present invention is the provision of an improved navigation computer that may be operated with one hand to solve all navigational problems.

It is a further object of the present invention to provide an improved navigation computer that is suitable for rapid and accurate correlation of the true course, true airspeed, wind speed and wind direction to obtain accurate graphical representation of the ground speed and true heading of the aircraft for effective navigation of an aircraft.

An additional object of the present invention is to provide an improved navigation computer having an improved cursor and slide assembly operable to provide rapid and accurate graphical representation of the wind speed and direction without the use of a separate marking device, thereby facilitating one-hand operation of the computer. In this connection, it is a further object to provide an cursor and slide assembly which is less susceptible to damage or breakage.

Still another object is to provide an improved navigational computer having color separation between the scales thereon, to make each scale stand out and provide easy selection.

Still another object is to provide an improved navigational computer having the wind triangle scales in the centimeters, rather than 30 units per inch as is standard, so that more space between units is provided, and far greater accuracy speeds are laid out in single units.

A still further object is to provide an improved navigational plotter having a simplified construction which eliminates the necessity for centering the wind vector slide. With this construction it is further contemplated that the cost of manufacture be substantially reduced.

A still further object is to provide an improved navigational computer having a flight log on the reverse side of the wind vector scale which is arranged so that each leg of the flight is underscored by moving the slide or body portion as the flight progresses. Also, the compass work form for each leg is automatically kept in unison with its corresponding leg of the flight log.

Another object is to provide an improved navigational computer having a compass rose and wind disc which can be used as a runway indicator to help visualize runway directions when landing.

Still another object is to provide an improved navigational computer designed so as to substantially eliminate errors due to parallax readings.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 1 is a top plan view of the wind vector side of the computing device;

FIG. 2 is a top plan view of the slide rule side of the computing device;

FIG. 3 is a side plan view of the computing device of FIGS. 1 and 2;

FIG. 4 is a sectional view taken along lines 4—4 of FIG. 1 illustrating the alignment bars fixedly secured to the top and bottom members of the computer body, for maintaining the alignment of the slide member;

FIG. 5 is a sectional view which would be taken along the same lines 4—4 of FIG. 1, illustrating an alternative method of maintaining the alignment of the slide member;

FIG. 6 is a partial sectional view, illustrating the manner in which the alignment bars function to maintain the alignment of the slide member; and FIG. 7 is a perspective view of the cursor slider.

Similar reference characters refer to similar parts throughout the several views of the drawings.

Referring now to the drawings, in FIGS. 1–3 there is shown a computing device 10 having an elongated, rectangular slide member 12 which has a plurality of radial lines and arcs 14 and 16, respectively, on one of its surfaces. The slide member 12 may be of a suitable solid plastic material or of metal having the lines 14 and the arcs 16 permanently formed thereon in a suitable fashion. A preferred method of forming the slide member 12 is to make a photolithograph of the lines 14 and the arcs 16 on suitable material and laminate the latter between two sheets of transparent plastic having sufficient rigidity to provide a flexible but yet sturdy slide member 12.

The radial lines 14 are calibrated from 0° to 50° for the purposes of illustration, and are identified by the numerals 18. The radial lines 14 and numerals 18 are employed to indicate degrees of drift to the left or right of a center line 20, designated as the 0° drift line. The center line is positioned on the longitudinal axis of the slide member 12.

The arcs 16 are provided at evenly spaced intervals along the surface of the slide member 12 and are perpendicular at the respective points of intersection with each of the radial lines 14. The arcs 16 graphically represent speed arcs and are calibrated in centimeters, rather than 30 units per inch as it is generally standard to do on all presently available similar computing devices. Furthermore, the speed arcs 16 are laid-out in units and each increment of 10 is numbered (for purposes of illustration) from 40 to 300. With this arrangement, far greater accuracy and readability is provided, than heretofore generally possible.

For even greater readability, the area beneath and upon which the numerals 18 and the indicia on the speed arcs 16 are printed is colored differently than the rest of the surface of the slide member 12. This color separation highlights the numerals and the indicia on the speed arcs so that they stand out and are clearly readable. In addition, the color separation clearly defines their location on the surface of the slide member 12 so that the party using the computing device 10 need not scan it to locate them.

A computer body 22 having a top member 24 (FIG. 1) which forms a wind vector side and a bottom member 26 (FIG. 2) which forms a circular slide rule side is mounted for translatory movement along the rectangular slide member 12. The top and bottom members 24 and 26 are affixed together by means of fasteners 28, which are preferably grommets, in overlying, spaced relationship, in a manner described more fully below, so as to slidably receive the slide member 12 therebetween.

The top and bottom members 24 and 26 preferably have identical outlines so that they may be easily aligned and affixed together in a manner described more fully below. In the illustrated embodiment, the top and bottom members both are substantially rectangular-shaped and have parallel top and bottom straight-edges 29 and 30. Their opposite side edges 31 and 32 also are parallel and the distance between them corresponds to the width of the slide member 12. The side edges 31 and 32 are extended outwardly to form flange portions 34 and 36 having parallel side edges 37 and 38. These side edges are connected to respective ones of the side edges 31 and 32 by converging angularly tapered sections 39 and 40. The side edges 37 and 38 of the flange portions 34 and 36, at the central portions thereof, also curve outwardly in opposite directions and form arcuate sections 41 and 42 which circumscribe a circle, about a central axis 43, defined by grommet 45 (FIG. 1), within which is mounted a circular compass rose member 44.

The circular compass rose member 44 is rotatably affixed to the top member 24, by means of the grommet 45, and is of a transparent material. A compass rose which is calibrated from 0° to 360° and generally indicated by the reference numeral 46 is printed on it, adjacent its peripheral edge. A variation or drift scale 48 which has identifying numerals 50 thereon at 10° intervals, on each side of a True Index 52, is provided on the top member 24 in cooperative alignment with the compass rose 46, to provide a convenient reference for drift to the right or left. The area beneath the compass rose 46 and the drift scale 48 is colored differently than the rest of the surface of the top member 24, so as to highlight the indicia of the two scales to improved readability.

A cursor disc 54 also is rotatably affixed by means of the grommet 45 to the top member 24, atop the compass rose member 44. The cursor disc 54 is of a transparent material and has two parallel slots 55 and 56 formed therein on opposite sides of a cursor line 57 which extends across one diameter of the cursor disc 54, through its central axis. A second cursor line 58 extends across another diameter of the cursor disc 54, through its central axis, and is perpendicular to the cursor line 57. The cursor disc 54 also is provided with a series of markings 60 which decrease in series from its central axis to one periphery thereof, which markings graphically represent wind speed. A ten mile per hour circle 53 also is inscribed about the grommet 45 for quick reference. The series of markings 60 comprise two scales which are inverted with respect to one another and are positioned between the slots 55 and 56, partly on and partly along the opposite sides of an opaque arrowhead 62. The arrowhead 62 is solid from the central axis to the one peripheral edge, under the markings 60, and is open centrally thereof to the opposite peripheral edge so as to obscure a minimum amount of the indicia on the slider member 12. The arrowhead 62, in addition to highlighting the markings 60, indicates the wind direction and further functions as a runway indicator, as described more fully below. A ten mile per hour circle 53 also is inscribed about the grommet 45 for quick reference, and a reciprocal marker 59 is positioned on the top member 22 diametrically opposite the True Index 52.

A cursor slider 64 (FIGS. 1 and 7) which is substantially rectangular-shaped has a pair of flange portions 65 and 66 on opposite sides thereof, each of which includes a raised substantially semi-circular shaped guide stop 68 and a flat substantially rectangular-shaped slot lock 69. The cursor slider 64 is easily and quickly slidably mounted atop the cursor disc 54 by engaging the slot locks 69 in respective ones of the slots 55 and 56. The side walls of the guide stops 68 slide about the edges of the slots 55 and 56 to retain the cursor slider 64 within the slots and against misalignment. The cursor slider 64 has a marking 70 on it which is in adjustable mating relationship with the markings 60 on the cursor disc 54. Another marking 72, which is generally a circle with a dot in it, also is provided on the cursor slider 64. These markings 70 and 72 are utilized, as hereinafter described.

The top member 24 is positioned atop the slide member 12 and is held in alignment with it so that the central axis 43 moves along the 0° drift line 20 when the slide member is moved with respect to the computer body 22. Generally, with prior devices, this positioning and alignment is accomplished by inserting and slidably retaining the slide member 12 within grooves formed within molded spacers adjustably affixed between the top and bottom members of the computer body. Normally, slotted apertures are provided in the spacers and threaded screws are extended through them as well as the top and bottom members to assemble the computer body. Anyone assembling or thereafter adjusting the alignment between the central axis of the computer body and the slide member can attest to the difficulties encountered in initially aligning or thereafter re-aligning the slide member, when they are assembled and aligned with this type of arrangement. It is not unusual for the computing device to become mis-aligned, as a result of use or dropping it, so that it has to be frequently re-aligned. The molded spacers also are of a substantial thickness so that they create problems with parallax readings and, in addition, add considerably to the cost of the computing device. Accordingly, for these as well as a number of other reasons, it would be advantageous to eliminate them.

These spacers and the problems they present in assembling and aligning a computing device are overcome with the computing device 10 of the present invention, by using the same fastener means to fixedly secure the top and bottom members 24 and 26 thereof together and to align the slide member 12 with respect to the central axis 43 of the top member 24. More specifically, in assembling the computing device 10, the top and bottom members 24 and 26 are placed within a jig (not shown) which is adapted to positionally align them one atop the other. Drill means or the like (not shown) which may be an integral part of the jig next accurately form apertures in the top and bottom members, for receiving the fastener means or grommets 28. These apertures are accurately aligned so that the side edges of the slide member 12 slidably engage the grommets 28. The grommets 28 also are formed in a fashion such that the top and bottom members 24 and 26 are fixedly secured together in spaced relation, so that the slide member 12 is slidably received between them. A pair of alignment bars 74 also are preferably affixed to one of the top and bottom members 24 and 26, between them and in sliding engagement with the opposite sides of the slide member 12, as shown in FIG. 4. Alternatively, a number of dimples 78 (FIG. 5) can be formed in one or both of the top and bottom members 24 and 26, in positions so as to be slidably engaged by the side edges of the slide member 12. With this arrangement, the side edges of the slide member 12 slidably engage the grommets 28 and accordingly are fixedly held in alignment. If the slide member 12 is slid out of the computer body 22 a sufficient distance so that its side edges at its top or bottom become disengaged from either of the pairs of horizontally aligned grommets 28, these side edges will engage the alignment bars 74 and 76, or the dimples 78, to prevent the slide member 12 from being angularly displaced out of alignment, as illustrated in FIG. 6. Accordingly, it can be seen that it is virtually impossible for the slide member to become mis-aligned, either during assembly or thereafter. Of equal importance is the fact that the computing device 10 can be easily and quickly assembled, and without the need of the spacers which are normally used. These factors result in a substantial reduction in the manufacturing cost of the computing device so that the retail cost can likewise be reduced.

The computing devices 10 also provide substantial improvements over presently available similar computing devices since, as indicated above, the alignment problems which heretofore existed with the prior devices are virtually eliminated. In addition, when assembled in the described fashion, the top member 24 is in sliding engagement with the slide member 12, as can be best seen in FIG. 3, and is not held in spaced relationship to it as when spacers are used. Accordingly, errors due to parallax readings also are virtually eliminated.

Referring now to FIG. 2, it can be seen that the bottom member 26 which forms the circular slide rule side of the computing device 10 has a disc 80 rotatably affixed to it, by means of a fastener such as the rivet 82. A C scale 84 is imprinted on the disc 80, adjacent its peripheral edge. A stationary D scale 86 is imprinted on the bottom member 26, about the periphery of and in cooperative relationship with the C scale 84. The C scale 84 and the D scale 86 are like those of a conventional slide rule except that they are numbered 10 to 100 to fit air navigational probelms. The D scale 86 is also generally known as the miles and gallons scale, while the C scale 84 is generally referred to as the minutes scale. A prominent arrowhead 88 at 60 minutes, or one hour, is provided on the C scale 84, for convenient reference. In addition to these described scales, the slide rule side of the computing device 10 has a number of other scales and conversion markers which are useful in aircraft operation. In this respect, the slide rule side is generally similar to other similar presently available slide rules for solving aircraft navigational problems. The primary distinction and improvement provided on the slide rule side of the computing device of the present invention is to provision of color separation between the different scales, which color separation is such that the readability of the indicia is substantially improved and the related scales are color-coded so that confusion is eliminated. This color-coding or color separation is generally represented with the reference numerals 90, 92, 94, 96 and 98.

A centigrade-Fahrenheit conversion scale 100 also is provided on the bottom member 26, for convenience.

Another substantially improvement in the computing device 10 is the provision of a flight log and a compass work form, generally represented with the reference numerals 102 and 104, respectively, on the opposite, or slide rule side, of the slide member 12. The flight log 102 and the compass work form 104 are arranged in a cooperative relationship with the straight-edges 29 and 30 of the bottom member 26, so that each leg of the flight is underscored by moving the computer body 22 as the flight progresses. In doing so, the compass work form for each leg of the flight is automatically kept in unison with its corresponding flight leg, by the straight-edge 30, as generally illustrated in FIG. 2. The flight log 102 and the compass work form 104 each are provided on a matted surface so that computed data for a flight can be easily recorded and revised as the flight progresses.

From the above description, it can be seen that a substantially improved compting device 10 is provided, which can be easily and quickly assembled. Furthermore, its construction is such that alignment of the slide member 12 is easily accomplished and, furthermore, is maintained. The indicia including the lines, arcs, numerals, scales and the like thereon are presented in a fashion such as to substantially improve its readability and to eliminate confusion. Accordingly, it is extremely suited for use by novice pilots and navigators, as well as those with more experience.

The operation of the computer for the solution of navigational problems can be readily understood from the following description of its operation, in conjunction with FIG. 1.

Initially, the True Course, which is the path it is desired to have the aircraft travel with respect to the ground, is selected on the compass rose member 44, by rotating the same so that the corrpesponding calibration on the compass rose is aligned with the True Index 52 on the top member 24. The cursor slider 64 is then moved along the cursor disc 54, in the path defined by the pair of parallel slots 55 and 56, until the marking 70 coincides exactly with the wind speed markings or scale 60. The cursor disc 54 is then rotated and positioned, with respect to the compass rose member 44, such that the arrow 62 is aligned with the corresponding calibration on the compass rose, and in the direction from which the weather bulletin indicates the wind is blowing, with the arrow pointing in that direction. The top member 24 (or computer body 22) is then moved along the slide member 12 until the marking 72 on the cursor slider 64 lies on the true or corrected air speed arc (the true speed being the indicated air speed corrected for temperature and pressure) on the face of the slide member 12. The position of the marking 72 then indicates the drift correction angle of the aircraft, the drift correction angles being represented, as indicated above, by the radial lines 14. The ground speed is then read under the central axis defined by the grommet 45, on the speed arcs 16 on the slide member 12.

The compass rose member 44 and the cursor disc 54 also can be used to picture the relative position of a runway with respect to the heading. This is accomplished by setting the heading of the aircraft at the True Index 52, and rotating the cursor disc 54 so that the arrow 62 points in the direction of the runway. The aircraft is visualized at the grommet 45, while the solid portion of the arrow 62 represents and is visualized as the runway.

The computer side of the computing device 10 is used in the well-known manner, and is applicable for solving all types of speed, distance and time problems, fuel consumption problems, air speed and altitude corrections, as well as a whole host of other problems normally encountered while navigating an aircraft.

The flight log 102 is used to record computed data for the flight and revised actual data as the flight progresses. The compass work form 104 is used to convert chart directions to usable compass values. As indicated above, the straight edges 29 and 30 of the bottom member 26 underscores each of the flight legs, when the computer body 22 is moved with respect to the slide member 12. In addition, the compass work form corresponding to each leg of the flight is automatically kept in unison with its associated flight leg, by the straight edge 30.

In storing the computer 10 within a carrying case of the type having a pocket therein in which the computer is slidably inserted, the cursor disc 54 preferably is rotatably positioned so that the cursor slider 64 extends transversely with respect to the slide member 12 or computer body 22. When positioned in this fashion, the cursor slider 64 is less subject to damage by, for example, snagging the edge of the carrying case beneath it, since the edge will engage the raised stop guides 68 before it can become snagged.

The computer 10 also is extremely accurate in that the speed arcs 16 can be easily read to ½ mile per hour. As indicated above, the speed arcs 16 are calibrated in centimeters and are further laid out in units. In using the computer, the ground speed is read under the central axis defined by the grommet 45, on the speed arcs 16. The relationship of the grommet 45 to the speed arcs is such that when two of the unit speed arcs are visible through the grommet, the speed is easily interpolated to the nearest ½ mile per hour. In other words, if the unit speed arcs representing 150 and 151 miles per hour are visible through the grommet, the actual speed is 150.5 miles per hour. If the ground speed is 150 miles per hour, for example, only the speed arc representing 150 miles per hour will be visible through the grommet. Accordingly, the ground speed can be read far more easily and far more accurately with the computer 10 than it can be with presently available computers.

It can be seen from the description of the structure and operation of the computing device 10 that it has all of the features and advantages of presently available similar computing devices and, in addition, has many more which are not. Its structure is such that it can be easily and quickly assembled and aligned, and its indicia and scales are such that they can be easily read. Accordingly, each of the above objectives are satisfied with the computing device 10.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Now that the invention has been described, what is claimed as new and desired to be secured by Letters Patent is:

1. A plotting and computing device for solving navigational problems comprising: an elongated rectangular slide member having indicia thereon and a body portion having indicia thereon which cooperates with the indicia on said slide member to solve said navigational problems positioned on said slide member for slidable translatory movement therealong, said body portion including a top and a bottom member and a plurality of guide pins which function both to affix said top and bottom members together loosely atop one another with said slide member therebetween and to slidably abut said slide member to align it with respect to said body portion so that said indicia on said slide member and on said body portion is maintained in cooperative alignment, said guide pins and said slide member being arranged to maintain said top and bottom members in spaced relation so that said slide member can be slidably received between them.

2. The plotting and computing device of claim 1 further including a 360° compass rose member rotatably mounted atop said top member, a disc member rotatably mounted atop said 360° compass rose member and having a pair of spaced, parallel slots therein, a cursor slider having a flange integral with each of its opposite sides which is formed to slidably fit within one of said slots to slidably affix said cursor slider to said disc and is folded to form an abutment for aligning said cursor slider therein, said disc member having a plurality of markings thereon from the center thereof to its peripheral edge which are adapted graphically to represent wind speed, said cursor slider having a first marking adjacent one end thereof to overlie said wind speed marking on said disc member and a second marking adjacent the other end thereof, said disc member and said cursor slider providing means to graphically represent the wind direction and speed.

3. The plotting and computing device of claim 1, further including alignment means between said top and bottom members, for maintaining said slide member in alignment when the side edges of said slide member at the opposite ends thereof are disengaged with one of said pairs of guide pins.

4. The plotting and computing device of claim 2 wherein said alignment means comprises a straight-edged member affixed to one of said top and bottom members on each of the opposite side edges of said slide member.

5. The plotting and computing device of claim 2 wherein said alignment means comprises a plurality of dimpled protrusions formed in at least one of said top and bottom members so as to project between said top and bottom members on each of the opposite side edges of said slide member.

6. The plotting and computing device of claim 1 wherein said slide member has a flight log and a compass work form on its opposite side, and wherein at least said bottom member is formed to underscore each leg of the flight as said body member is moved transversely to said slide member, said compass work form for each leg being automatically kept in unison with its corresponding leg of the flight log during said movement.

7. The plotting and computing device of claim 6 wherein the upper and lower end edges of both said top and bottom members are straight-edges and are parallel to one another so as to underscore each leg of the flight and its related compass work form.

8. The plotting and computing device of claim 1 wherein said guide pins comprises at least two pairs of grommets, each of which is affixed to said top and bottom members so as to secure them together atop one another in a spaced relationship such that said slide member is easily slidable therebetween.

9. The plotting and computing device of claim 8 wherein each of said guide pins in the respecting pairs of guide pins are horizontally aligned.

References Cited

UNITED STATES PATENTS

| | | | |
|---|---|---|---|
| 2,916,207 | 12/1959 | Vohland | 235—61 |
| 3,112,875 | 12/1963 | Van Caro et al. | 235—70 |
| 3,131,858 | 5/1964 | Warner | 235—78 |
| 3,231,188 | 1/1966 | Warner | 235—84 |

RICHARD B. WILKINSON, *Primary Examiner.*

STANLEY A. WAL, *Assistant Examiner.*